US012789893B2

(12) United States Patent
Kitamura

(10) Patent No.: US 12,789,893 B2
(45) Date of Patent: Nov. 10, 2026

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventor: Yuki Kitamura, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 19/059,606

(22) Filed: Feb. 21, 2025

(65) Prior Publication Data

US 2025/0304165 A1 Oct. 2, 2025

(30) Foreign Application Priority Data

Mar. 27, 2024 (JP) ................................ 2024-051002

(51) Int. Cl.

*B62D 15/02* (2006.01)
*B60W 10/20* (2006.01)
*B60W 30/12* (2020.01)

(52) U.S. Cl.

CPC ........... *B62D 15/025* (2013.01); *B60W 10/20* (2013.01); *B60W 30/12* (2013.01); (Continued)

(58) Field of Classification Search

CPC ..... B62D 15/025; B60W 10/20; B60W 30/12; B60W 2540/18; B60W 2552/30; B60W 2552/35; B60W 2710/20; B60W 2050/143; B60W 50/14; B60W 2552/53; B60W 10/18; B60W 50/16; B60W 2050/146

See application file for complete search history.

(56) References Cited

U.S. PATENT DOCUMENTS

2005/0270145 A1 12/2005 Kataoka et al.
2012/0320210 A1 12/2012 Imai et al.
(Continued)

FOREIGN PATENT DOCUMENTS

JP 2005-182243 7/2005
JP 2005-343303 12/2005
(Continued)

OTHER PUBLICATIONS

Japanese Office Action for Japanese Patent Application No. 2024-051002 mailed Dec. 2, 2025.

*Primary Examiner* — Grant Moubry

*Assistant Examiner* — Ruben Picon-Feliciano

(74) *Attorney, Agent, or Firm* — Amin, Turocy & Watson, LLP

(57) ABSTRACT

A vehicle control device includes a recognizer configured to recognize surroundings of a vehicle, a steering operation detector configured to detect a steering operation of the vehicle by a driver of the vehicle, a determiner configured to determine whether the vehicle is likely to deviate from a travel lane on the basis of a result of recognition by the recognizer, and a controller configured to output a deviation alarm to the driver when the determiner determines that the vehicle is likely to deviate from the travel lane, in which the controller suppresses an output of the deviation alarm when a lane keeping steering operation for keeping the vehicle in a lane is detected by the steering operation detector.

5 Claims, 5 Drawing Sheets

(52) U.S. Cl.
CPC ..... *B60W 2540/18* (2013.01); *B60W 2552/30* (2020.02); *B60W 2552/35* (2020.02); *B60W 2710/20* (2013.01)

(56) References Cited

U.S. PATENT DOCUMENTS

| | | | | |
|---|---|---|---|---|
| 2022/0204082 | A1 | 6/2022 | Fukutomi | |
| 2022/0309804 | A1* | 9/2022 | Inoue | G06V 10/809 |
| 2023/0126820 | A1 | 4/2023 | Miyawaki | |

FOREIGN PATENT DOCUMENTS

| | | |
|---|---|---|
| JP | 2005-346269 | 12/2005 |
| JP | 2006-331304 | 12/2006 |
| JP | 2010-058739 | 3/2010 |
| JP | 5018092 | 9/2012 |
| JP | 2013-003913 | 1/2013 |
| JP | 6658235 | 3/2020 |
| JP | 2022-102746 | 7/2022 |
| JP | 2023-065143 | 5/2023 |

* cited by examiner

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2024-051002, filed Mar. 27, 2024, the content of which is incorporated herein by reference.

BACKGROUND

Field of the Invention

The present invention relates to a vehicle control device, a vehicle control method, and a storage medium.

Description of Related Art

In recent years, there has been increased effort to provide an access to sustainable transport systems that take vulnerable transport participants into consideration. To realize this, research and development to further improve the safety and convenience of traffic through research and development related to a preventive safety technology has been mainly focused upon. With regard to this, in recent years, a technology has been disclosed, which increases, when it is determined that the driver is in a curve recognition state in which he or she recognizes a curve in front of his or her vehicle, a steering auxiliary torque compared to a case where it is not determined that the driver is in a curve recognition state, or notifies with an alarm, provides information, or performs lane keeping control of any one of an automatic steering operation and an automatic braking operation of a vehicle on the basis of a time it takes for the vehicle to reach a lane marking (for example, Japanese Patent No. 5018092 and Japanese Patent No. 6658235).

SUMMARY OF THE INVENTION

Incidentally, in preventive safety technology, there have been cases where control of lane deviation of a vehicle may be excessively executed, and appropriate deviation suppression control may not be executed.

To solve the problems described above, one of the purposes of this application is to provide a vehicle control device, a vehicle control method, and a storage medium that can perform more appropriate deviation suppression control according to a driving situation of a driver. In turn, this will contribute to development of sustainable transport systems.

The vehicle control device, the vehicle control method, and the storage medium according to the present invention have adopted the following configuration.

(1): A vehicle control device according to one aspect of the present invention includes a recognizer configured to recognize surroundings of a vehicle, a steering operation detector configured to detect a steering operation of the vehicle by a driver of the vehicle, a determiner configured to determine whether the vehicle is likely to deviate from a travel lane on the basis of a result of recognition by the recognizer, and a controller configured to output a deviation alarm to the driver when the determiner determines that the vehicle is likely to deviate from the travel lane, in which the controller suppresses an output of the deviation alarm when a lane keeping steering operation for keeping the vehicle in a lane is detected by the steering operation detector.

(2): In the aspect of (1) described above, when the lane keeping steering operation is detected by the steering operation detector while the vehicle is within a predetermined distance before a curved road or is traveling on the curved road, the controller may suppress an output of the deviation alarm even if the vehicle is determined to be likely to deviate from the travel lane.

(3): In the aspect of (1) described above, the steering operation detector may detect the lane keeping steering operation on the basis of a steering operation in which a torque of a steering operator that receives a steering operation of the driver is in a predetermined range.

(4): In the aspect of (3) described above, the predetermined range may be at least a range in which information on a torque of the steering operator for turning by the vehicle and a torque of the steering operator caused by an unevenness of a road surface on which the vehicle is traveling is excluded.

(5): In the aspect of (3) described above, a lower limit of the predetermined range may be a value greater than 0.

(6): In the aspect of (3) described above, the steering operation detector may determine that the lane keeping steering operation has not been performed when a steering operation within the predetermined range has not been detected for a predetermined time or more.

(7): A vehicle control method includes, by a computer, recognizing surroundings of a vehicle, detecting a steering operation of the vehicle by a driver of the vehicle, determining whether the vehicle is likely to deviate from a travel lane, outputting a deviation alarm to the driver when the vehicle is determined to be likely to deviate from the travel lane, and suppressing an output of the deviation alarm when a lane keeping steering operation for keeping the vehicle in a lane is detected.

(8): A computer-readable non-transitory storage medium that has stored a program causing a computer to execute recognizing surroundings of a vehicle, detecting a steering operation of the vehicle by a driver of the vehicle, determining whether the vehicle is likely to deviate from a travel lane, outputting a deviation alarm to the driver when the vehicle is determined to be likely to deviate from the travel lane, and suppressing an output of the deviation alarm when a lane keeping steering operation for keeping the vehicle in a lane is detected.

According to the aspects of (1) to (8) described above, more appropriate deviation suppression control can be performed according to a driving situation of the driver.

DESCRIPTION OF EMBODIMENTS

Hereinafter, embodiments of a vehicle control device, a vehicle control method, and a program of the present invention will be described with reference to the drawings.

Overall Configuration

Figure 1:
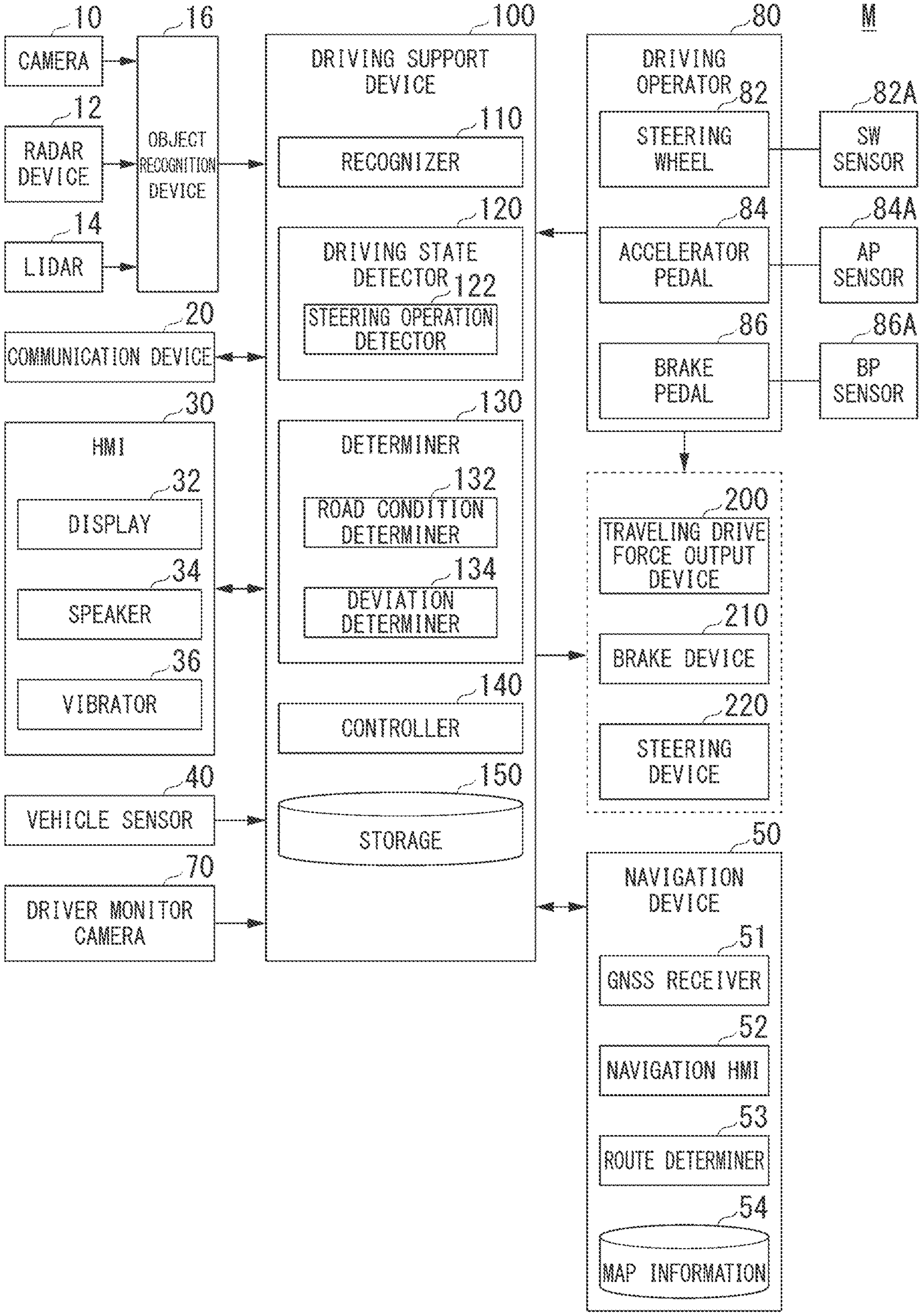
FIG. 1 is a configuration diagram of a vehicle in which a vehicle control device of an embodiment is mounted.

FIG. 1 is a configuration diagram of a vehicle M in which a vehicle control device of an embodiment is mounted. The vehicle M is, for example, a vehicle such as a two-wheeled vehicle, a three-wheeled vehicle, or a four-wheeled vehicle, and a drive source thereof is an internal combustion engine such as a diesel engine or a gasoline engine, an electric motor, or a combination thereof. The electric motor operates using electric power generated by a generator connected to the internal combustion engine or discharge power of secondary batteries or fuel cells.

The vehicle M includes, for example, a camera 10, a radar device 12, a light detection and ranging (LIDAR) 14, an object recognition device 16, a communication device 20, a human machine interface (HMI) 30, a vehicle sensor 40, a navigation device 50, a driver monitor camera 70, a driving operator 80, a driving support device 100, a traveling drive force output device 200, a brake device 210, and a steering device 220. These devices and apparatuses are connected to each other by a multiplex communication line such as a controller area network (CAN) communication line, a serial communication line, a wireless communication network, or the like. The configuration shown in FIG. 1 is merely an example, and a part of the configuration may be omitted or another configuration may be added. The HMI 30 is an example of an “alarm” or “notifier.” The driving support device 100 is an example of the “vehicle control device.”

The camera 10 is a digital camera that uses a solid-state image sensor such as a charge coupled device (CCD) or a complementary metal oxide semiconductor (CMOS). The camera 10 is attached to an arbitrary place of the vehicle M. When an image of the front is captured, the camera 10 is attached to an upper part of the front windshield, a back surface of the windshield rear-view mirror, and the like. The camera 10 periodically and repeatedly captures, for example, a periphery of the vehicle M. The camera 10 may be a stereo camera.

The radar device 12 radiates radio waves such as millimeter waves to the periphery of the vehicle M, and also detects at least a position (a distance and an orientation) of an object by detecting radio waves (reflected waves) reflected by the object. The radar device 12 is attached to an arbitrary place on the vehicle M. The radar device 12 may detect the position and speed of an object in a frequency modulated continuous wave (FM-CW) method.

The LIDAR 14 irradiates the periphery of the vehicle M with light (or electromagnetic waves with wavelengths close to that of light) and measures scattered light. The LIDAR 14 detects a distance to a target based on a time from light emission to light reception. The irradiated light is, for example, a pulsed laser beam. The LIDAR 14 is attached to an arbitrary place on the vehicle M.

The object recognition device 16 performs sensor fusion processing on a result of detection by some or all of the camera 10, the radar device 12, and the LIDAR 14, and recognizes the position, type, speed, and the like of an object. The object recognition device 16 outputs a result of recognition to the driving support device 100. The object recognition device 16 may output the results of detection by the camera 10, the radar device 12, and the LIDAR 14 to the driving support device 100 without changing. The object recognition device 16 may be omitted from the vehicle M. Some or all of the camera 10, the radar device 12, the LIDAR 14, and the object recognition device 16 are examples of an “external world detection device.”

The communication device 20 communicates with other vehicles present in the periphery of the vehicle M using, for example, a network such as a cellular network, a Wi-Fi network, Bluetooth (a registered trademark), or dedicated short range communication (DSRC), or communicates with various server devices via a wireless base station.

The HMI 30 presents various types of information to an occupant of the vehicle M and receives an input operation from the occupant. The HMI 30 includes, for example, a display 32, a speaker 34, and a vibrator 36. The display 32 is, for example, a liquid crystal display (LCD), an organic electro luminescence (EL) display device, and the like. The display 32 displays various images (including moving images) in the embodiment. The display 32 may be integrated with an input as a touch panel. The speaker 34 outputs a predetermined sound (for example, an alarm, or the like). The vibrator 36 vibrates at least one of a steering wheel 82 included in the driving operator 80, a seat on which the occupant is seated, and a seat belt in use on the basis of, for example, an instruction of the driving support device 100. For example, the vibrator 36 notifies the driver (hereinafter referred to as the driver) of the vehicle M that it is in a predetermined situation by vibration. The HMI 30 may be a microphone, a buzzer, a touch panel, a switch, a key, or the like in addition to (or alternatively) the display 32, the speaker 34, and the vibrator 36. For example, the HMI 30 may include a switching switch that switches between driving states (driving control contents) of the vehicle M by an operation of the driver.

The vehicle sensor 40 includes a vehicle speed sensor that detects a speed of the vehicle M, an acceleration sensor that detects the acceleration, a yaw rate sensor that detects the yaw rate (for example, an angular speed of rotation around a vertical axis through a center of gravity of the vehicle M), a lateral acceleration sensor that detects a lateral acceleration (transverse G) of the vehicle M, an orientation sensor that detects a direction of the vehicle M, a steering angle sensor that detects a steering angle of the vehicle M (it may be an angle of the steering wheel or an operation angle of the steering wheel), and the like. The vehicle sensor 40 may be provided with a position sensor that detects a position of the vehicle M. The position sensor is, for example, a sensor that acquires position information (longitude and latitude information) from a global positioning system (GPS) device. The position sensor may be a sensor that acquires position information using a global navigation satellite system (GNSS) receiver 51 of the navigation device 50.

The navigation device 50 includes, for example, a GNSS receiver 51, a navigation HMI 52, and a route determiner 53. The navigation device 50 holds map information 54 in a storage device such as a hard disk drive (HDD) or a flash memory. The GNSS receiver 51 identifies the position of the vehicle M based on a signal received from a GNSS satellite. The position of the vehicle M may be identified or complemented by an inertial navigation system (INS) using an output of the vehicle sensor 40. The navigation HMI 52 includes a display device, a speaker, a touch panel, a key, and the like. The navigation HMI 52 may be partially or entirely shared with the HMI 30 described above. The route determiner 53 determines, for example, a route from the position of the vehicle M (or an arbitrary position to be input) identified by the GNSS receiver 51 to a destination to be input by the occupant using the navigation HMI 52 (hereinafter, a route on a map) with reference to the map information 54. The map information 54 is, for example, information in which a road shape is expressed by a link indicating a road and nodes connected by the link. The map information 54 may include point of interest (POI) information, and the like. The map information 54 may include, for example, lane boundary information such as information on a center of a lane or a road partition line (hereinafter referred to as a partition line) that divides a lane. The map information 54 may include road information such as a radius of curvature (or curvature) of a road (or for each lane included in the road), a slope, and a width, traffic regulation information, address information (address and zip code), facility information, telephone number information, and the like. The map information 54 may be updated at any time by the communication device 20 communicating with other devices. The map information 54 may be stored in a storage in the driving support device 100.

The navigation device 50 may perform route guidance using the navigation HMI 52 based on the route on a map. The navigation device 50 may be realized by, for example, a function of a terminal device such as a smartphone or a tablet terminal owned by the occupant. The navigation device 50 may transmit a current position and a destination to a navigation server via the communication device 20 and acquire a route equivalent to the route on a map from the navigation server.

The driver monitor camera 70 is, for example, a digital camera using a solid-state imaging device such as CCD or CMOS. For example, the driver monitor camera 70 is attached at any place on the vehicle M, which is a position and a direction at which the head and upper body (including positions of the hands) of a driver seated in a driver's seat of the vehicle M can be imaged from the front (in a direction for imaging the face). For example, the driver monitor camera 70 is attached to an upper portion of a display device provided in a center portion of an instrument panel of the vehicle M. The driver monitor camera 70 outputs to the driving support device 100 an image of an interior of a vehicle including the driver of the vehicle M captured from a position where it is disposed.

The driving operator 80 includes, for example, the steering wheel 82, an accelerator pedal 84, a brake pedal 86, an operation switch of turn signals, a shift lever, and other operators. The driving operator 80 has a sensor that detects the amount of operation or a presence or absence of an operation attached thereto, and a result of detection is output to the driving support device 100, or some or all of the traveling drive force output device 200, the brake device 210, and the steering device 220. The steering wheel 82 is an example of a "steering operator." The accelerator pedal 84 and the brake pedal 86 are examples of "speed operators."

For example, the steering wheel 82 is provided with a steering wheel sensor (SW sensor) 82A and a vibrator 36 that vibrates a portion grasped by the driver. The SW sensor 82A detects whether the driver is in contact with the steering wheel 82. The SW sensor 82A detects an operation amount (a torque (also referred to as a steering torque), a steering amount, and a steering change rate) of the steering wheel 82 that changes according to an operation of the driver on the steering wheel 82 (hereinafter referred to as a steering operation). The SW sensor 82A may detect whether the driver is grasping the steering wheel 82. The steering wheel 82 does not necessarily have to be annular, but may be in a form of an odd-shaped steering wheel, a joystick, a button, or the like. In that case, the SW sensor 82A detects the amount of operation according to each form.

The accelerator pedal 84 is provided with an accelerator pedal sensor (an AP sensor) 84A. The AP sensor 84A detects whether an operation of the driver on the accelerator pedal 84 (hereinafter referred to as an accelerator operation) is turned on or off, and an operation amount (an opening change amount or an opening change rate) of the accelerator pedal 84 that changes according to the operation. The brake pedal 86 is provided with a brake pedal sensor (a BP sensor) 86A. The BP sensor 86A detects whether the operation of the driver on the brake pedal 86 (hereinafter referred to as a brake operation) is turned on or off, and an operation amount (an opening change amount or an opening change rate) of the brake pedal 86 that changes according to the operation. Each of the accelerator and brake operations is an example of a "speed operation."

The traveling drive force output device 200 outputs a traveling drive force (torque) for traveling of the vehicle M to the drive wheels. The traveling drive force output device 200 includes, for example, a combination of an internal combustion engine, an electric motor, a transmission, and the like, and an electronic control unit (ECU) that controls these. The ECU controls the constituents described above according to information input from the driving support device 100 or information input from the driving operator 80.

The brake device 210 includes, for example, a brake caliper, a cylinder that transmits a hydraulic pressure to the brake caliper, an electric motor that generates a hydraulic pressure to the cylinder, and an ECU. The ECU controls the electric motor according to the information input from the driving support device 100 or the information input from the driving operator 80, and outputs a brake torque corresponding to a braking operation to each wheel. The brake device 210 may include a mechanism for transmitting the hydraulic pressure generated by an operation of the brake pedal 86 included in the driving operator 80 to the cylinder via the master cylinder as a backup. The brake device 210 is not limited to the configuration described above, but may be an electronically controlled hydraulic pressure brake device that controls an actuator according to the information input from the driving support device 100 and transmits a hydraulic pressure of the master cylinder to the cylinder.

The steering device 220 includes, for example, a steering ECU and an electric motor. The electric motor applies a force to, for example, a rack and pinion mechanism to change a direction of the steering wheel. The steering ECU drives the electric motor according to the information input from the driving support device 100 or the information input from the driving operator 80 to change the direction of the steering wheel.

Driving Support Device

The driving support device 100 includes, for example, a recognizer 110, a driving state detector 120, a determiner 130, a controller 140, and a storage 150. The recognizer 110, the driving state detector 120, the determiner 130, and the controller 140 are realized by, for example, a hardware processor such as a central processing unit (CPU) executing a program (software). Some or all of these components may be realized by hardware (a circuit; including circuitry) such as large scale integration (LSI), an application specific integrated circuit (ASIC), a field-programmable gate array (FPGA), a graphics processing unit (GPU), or system on chip (SOC) or may be realized by software and hardware in cooperation. A program may be stored in advance in a storage device (a storage device having a non-transitory storage medium) such as an HDD or flash memory of the driving support device 100, or may be stored in a detachable storage medium such as a DVD or a CD-ROM and installed in the HDD or flash memory of the driving support device 100 by the storage medium (non-transitory storage medium) being attached to a drive device.

For example, settings are made inside the traveling drive force output device 200, the brake device 210, and the steering device 220 so that instructions from the driving support device 100 to the traveling drive force output device 200, the brake device 210, and the steering device 220 are executed in preference to a detection result from the driving operator 80. With respect to braking, when a braking force based on an operation amount of the brake pedal 86 is greater than the instructions from the driving support device 100, the latter may be set to be executed in priority. As a mechanism for executing the instructions from the driving support device 100 in priority, communication priority in an in-vehicle local area network (LAN) may be used.

The storage 150 may be realized by the various storage devices described above, or by a solid state drive (SSD), an electrically erasable programmable read only memory (EEPROM), a read only memory (ROM), or a random access memory (RAM). The storage 150 stores, for example, programs, and various other types of information. The storage 150 may store the map information 54 described above.

The recognizer 110 recognizes surroundings of the vehicle M on the basis of information input from an external detection device. For example, the recognizer 110 recognizes states of an object in the vicinity (for example, within a predetermined distance (a first predetermined distance) from the vehicle M)) such as a position, a speed, and an acceleration. Examples of the object are traffic participants such as other vehicles, bicycles, pedestrians, curbs, medians, guardrails, and road structures. The position of the object is recognized as, for example, a position on absolute coordinates with a representative point (a center of gravity, a drive shaft center, or the like) as the origin point, and is used for control. The position of the object may be represented by a representative point such as the center of gravity or a corner of the object, or may be represented by a region. A "state" of the object may include an acceleration, jerk, or an "action state" (for example, whether it is changing lanes or is about to change lanes) of the object when the object is a moving object. The recognizer 110 recognizes a relative position and a relative speed of the object.

The recognizer 110 recognizes, for example, a lane (a travel lane) in which the vehicle M travels. For example, the recognizer 110 performs known analysis processing (for example, edge extraction, feature amount extraction, pattern matching processing, or the like) on an image captured by the camera 10 (hereinafter referred to as a camera image), and recognizes a position and a pattern of partition lines in the periphery of the vehicle M (for example, an array of solid lines and dashed lines) based on a result of the analysis. The recognizer 110 may refer to the map information 54 on the basis of position information of the vehicle M and recognize the position and pattern of the partition lines in the periphery of the vehicle M. The recognizer 110 may recognize the travel lane using at least one of the position or pattern of a partition line obtained from the camera image and the position or pattern of the partition line obtained from the map information. The recognizer 110 may recognize the travel lane by recognizing a travel road boundary (a road boundary) including a shoulder, a curb, a median, a guardrail, and the like, as well as a partition line. In this recognition, the position of the vehicle M acquired from the navigation device 50 and a result of processing by an INS may be added. The recognizer 110 may recognize adjacent lanes adjacent to the travel lane. The recognizer 110 may recognize a radius of curvature (or a curvature), a slope, a width, and the like of the travel lane (or road) based on at least one of the camera image and map information. The recognizer 110 recognizes obstacles, stop lines, red lights, toll booths, and other road events based on a result of the object recognition. The obstacle is an object with which the vehicle M needs to avoid contact, and includes, for example, other vehicles.

The recognizer 110 may recognize the position and a posture of the vehicle M with respect to the travel lane. The recognizer 110 may recognize, for example, a deviation of the reference point of the vehicle M from a center of the lane and an angle formed with respect to a line connecting the center of the lane in a traveling direction of the vehicle M as relative position and posture of the vehicle M with respect to the travel lane. Alternatively, the recognizer 110 may recognize a position of the reference point of the vehicle M with respect to any side end of the travel lane (a road partition line or road boundary) as a relative position of the vehicle M with respect to the travel lane. The recognizer 110 recognizes the position and posture of other vehicles traveling in the travel lane of vehicle M, or recognizes whether other vehicles are present on a center side of the travel lane or on a partition line side as seen from the vehicle M.

The driving state detector 120 detects a driving state of the vehicle M of the driver. The driving state includes, for example, the driving state of the vehicle M by the operation of the driver and the driving state of the vehicle M by driving control of the controller 140. The driving state detector 120 includes, for example, a steering operation detector 122. For example, the steering operation detector 122 detects a steering operation (lane keeping steering operation) of the driver to keep the vehicle M in the travel lane (to prevent the vehicle M from deviating from the lane). For example, the steering operation detector 122 detects a lane keeping steering operation by the driver when a steering operation having a steering torque detected by the SW sensor 82A being in a predetermined range. The steering operation detector 122 may detect a lane keeping steering operation by the driver when the steering operation within a predetermined range continues for a predetermined time (first predetermined time) or more. The steering operation detector 122 may detect a lane keeping steering operation by the driver when the vehicle M is traveling in a center of the lane by the steering operation on the basis of, for example, the steering operation and a change in distance between left and right partition lines of the vehicle M and the vehicle M.

The driving state detector 120 may detect a speed operation of the vehicle M by the driver (an operation for adjusting (changing) the speed of the vehicle M). In this case, the driving state detector 120 detects, for example, a start (an on state) or end (an off state) of an accelerator operation of the driver on the basis of a detection result of the AP sensor 84A, or detects an operation amount of the accelerator pedal 84. The driving state detector 120 detects the start and end of a brake operation of the driver on the basis of a detection result of the BP sensor 86A, and detects an operation amount of the brake pedal 86. On the basis of a detection result by the vehicle sensor 40, the driving state detector 120 may detect an amount of speed change (acceleration) of the vehicle M due to the driver performing a speed operation.

The driving state detector 120 may detect whether the driver is in a predetermined state based on the image captured by the driver monitor camera 70. The predetermined state may be, for example, a state in which the driver is monitoring the front (or a vicinity of the vehicle M), and may be a state in which the driving control on a system side of the vehicle M can be quickly transferred to manual operation of the driver. The state in which the driver monitors the front is, for example, that the driver's line of sight based on an analysis result of an image captured by the driver monitor camera 70 is facing the front (the traveling direction) of the vehicle M.

Based on the detection results of each of the SW sensor 82A, the AP sensor 84A, and the BP sensor 86A, or a driver state in the image captured by the driver monitor camera 70, the driving state detector 120 may detect a state in which the driver is not performing a driving operation (a state in which the driving operator 80 is not touched) or a state in which the driving operation is reduced (in other words, a state in which the driver is driving carelessly). The driving state detector 120 may detect a type of autonomous driving control performed by the controller 140.

The determiner 130 includes, for example, a road condition determiner 132 and a deviation determiner 134. The road condition determiner 132 determines a condition of a road on which the vehicle M travels. For example, the road condition determiner 132 determines whether a curved road is present within a predetermined distance (a second predetermined distance) in the traveling direction of the vehicle M on the basis of a result of recognition by the recognizer 110. For example, the road condition determiner 132 determines that a curved road is present in the travel lane when a radius of curvature within a predetermined distance in the traveling direction is less than a threshold value (a first threshold value) in the travel lane of the vehicle M. The road condition determiner 132 may use curvature instead of the radius of curvature in the curved road determination. Moreover, the road condition determiner 132 may determine whether the vehicle M is currently traveling on a curved road on the basis of the radius of curvature or curvature of the travel lane acquired by the method described above. In addition, the road condition determiner 132 may determine whether a lane in the traveling direction of the vehicle M is straight on the basis of the radius of curvature or curvature.

The deviation determiner 134 determines whether the vehicle M is likely to deviate from the travel lane. For example, the deviation determiner 134 determines whether the vehicle M is likely to deviate from the travel lane on the basis of a positional relationship between the left and right partition lines that divide the travel lane of the vehicle M recognized by the recognizer 110 and the vehicle M, and the traveling direction and speed of the vehicle M. Moreover, the deviation determiner 134 may determine whether the vehicle M is currently deviating from the travel lane.

The controller 140 controls various functions, devices, and the like of the vehicle M. For example, the controller 140 gives an alarm (notification) to the occupant of the vehicle M (including the driver) or executes driving control for controlling at least one of a speed and steering of the vehicle M on the basis of information obtained from the communication device 20, the HMI 30, the vehicle sensor 40, the driver monitor camera 70, and the like, information detected by the SW sensor 82A, the AP sensor 84A, and the BP sensor 86A, a result of recognition by the recognizer 110, a result of detection by the driving state detector 120, and a result of determination by the determiner 130.

For example, when it is determined by the deviation determiner 134 that the vehicle M is likely to deviate from the travel lane, the controller 140 controls at least one of the HMI 30 and the steering device 220, and executes control (off-road deviation suppression control) to prevent the vehicle M from deviating from the travel lane. Off-road deviation suppression control means, for example, executing (operating) at least one of the following controls (a) to (c).

(a) The controller 140 causes the HMI 30 to output information (image, sound, or the like) indicating that the vehicle M is likely to deviate or prompting the driver to perform a steering operation or speed operation to prevent the deviation.

(b) The controller 140 vibrates the steering wheel 82 using the vibrator 36.

(c) The controller 140 controls (steering reaction control) the steering device 220 so that the vehicle M returns to a center of the travel lane (so as to keep its position in the lane).

The control of (a) described above may include control to light or flash an output that outputs a predetermined light instead of (or in addition to) outputting an image or sound. The control of (b) described above may include control to vibrate a seat on which the driver is seated or a seat belt in use instead of (or in addition to) vibrating the steering wheel 82. The controller 140 executing at least one of the (a) and (b) described above is an example of outputting a "deviation alarm." In addition to the above, off-road deviation suppression control may include control to assist the vehicle M or the driver so that the vehicle M does not deviate from a lane. The controller 140 may perform control to suppress the output of the deviation alarm (alarm suppression control) according to a driving situation of the driver and the like. Details of the alarm suppression control will be described below.

On the basis of a result of the recognition by the recognizer 110 or the like, an instruction of the driver from the HMI 30, or the like, the controller 140 may execute driving control such as adaptive cruise control system (ACC) control that causes the vehicle M to travel in the travel lane constantly at a preset speed (a set vehicle speed), lane keeping assistance system (LKAS) control that causes the vehicle M to travel in the center of the travel lane, or auto lane change (ALC) control that causes the vehicle M to change lanes by operating at least the steering of the vehicle M. The controller 140 may also execute various types of driving control such as collision mitigation brake system (CMBS) control that warns the driver and perform braking control on the vehicle M and an emergency stop control that stops the vehicle M in a safe position when the vehicle M is likely to come into contact with an obstacle. When these types of driving control are executed, the controller 140 executes automatic operation control that automatically controls at least one of the steering and speed of the vehicle M.

The controller 140 may notify the occupant (including the driver) of predetermined information using the HMI 30. The predetermined information includes, for example, information related to the traveling of the vehicle M, such as information on a state of the vehicle M and information on driving control. The information on the state of the vehicle M includes, for example, the speed, an engine speed, a shift position, and the like of the vehicle M. The information on driving control includes, for example, a type of driving control being executed, a reason for operating the driving control, a status of the driving control, information indicating that the driving control has started or ended, and the like. The information on driving control may include information that prompts the driver to be alarmed, perform a predetermined driving operation, or call attention. The predetermined information may include information on a current position and a destination of the vehicle M, information on a remaining amount of fuel, and the like, and may also include information not related to the traveling control of the vehicle M, such as content (for example, a movie) stored in a storage medium such as a television program or DVD.

For example, the controller 140 may generate an image including the predetermined information described above and display the generated image on the display 32 of the HMI 30, and may also generate a sound indicating the predetermined information and output the generated sound from the speaker 34 of the HMI 30. A timing at which the sound is output is, for example, a timing of starting or stopping the driving control, a timing of switching an image to display at the time of receiving it, a timing when the vehicle M is in a predetermined state, and the like. The controller 140 causes the vibrator 36 to vibrate the steering wheel 82, the seat, the seat belt, and the like.

Alarm Suppression Control

Next, details of the alarm suppression control in the embodiment will be specifically described. For example, the controller 140 performs alarm suppression control on the basis of the driving situation of the driver to prevent the driver from feeling annoyed by an excessive output of a deviation alarm and to prevent an interference with driving.

Figure 2:
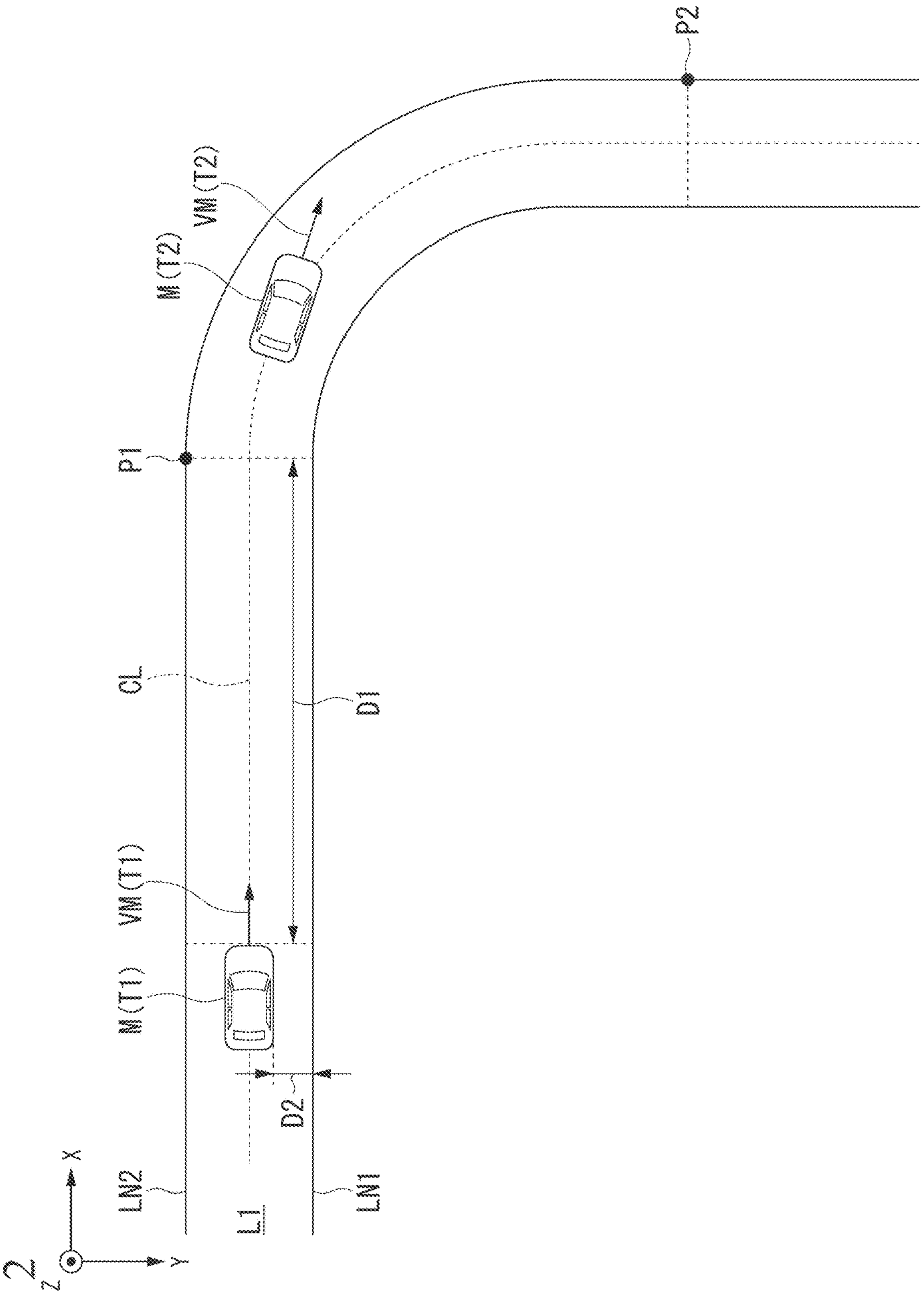
FIG. 2 is a diagram for describing alarm suppression control in the embodiment.

FIG. 2 is a diagram for describing alarm suppression control in the embodiment. In an example of FIG. 2, it is assumed that the vehicle M is traveling at a speed VM in a lane L1 divided off by left and right partition lines LN1 and LN2. A section of a part of the lane L1 (a section between points P1 and P2 in FIG. 2) includes a curved road having a radius of curvature below a threshold value (a first threshold value). In the example of FIG. 2, the position of the vehicle M at a time T* is expressed as M(T*) and the speed is expressed as VM(T*). In the following description, it is assumed that time elapses in order of a time T1 and a time T2. The vehicle M is assumed to travel by a manual operation of the driver using the driving operator 80.

In the example of FIG. 2, the vehicle M continuously executes processing of the driving state detector 120 and the determiner 130 at a predetermined cycle or timings during traveling. For example, the steering operation detector 122 of the driving state detector 120 detects lane keeping steering operation or the like of the vehicle M by the driver. For example, the steering operation detector 122 determines whether the steering operation of the driver is being performed so that a predetermined position (for example, the center of gravity or the center) of the vehicle M passes over a center CL1 of a lane. For example, the steering operation detector 122 detects a lane keeping steering operation on the basis of an operation amount (a steering torque) of the steering wheel 82. In the embodiment, to output the lane keeping steering operation more accurately, filtering processing is performed on the steering torque to extract only a torque within a predetermined range.

Figure 3:
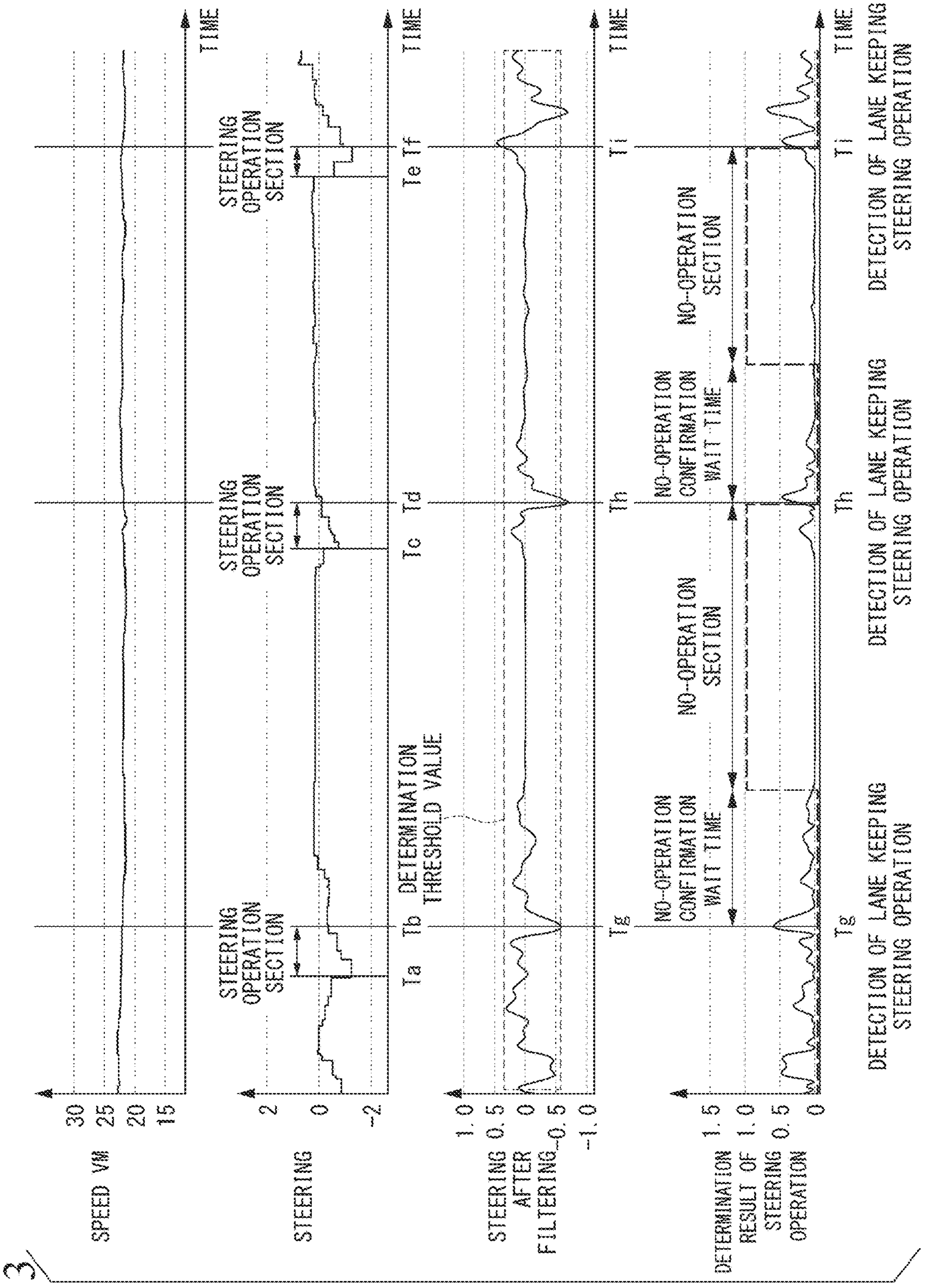
FIG. 3 is a diagram which shows an example of a result of filtering processing performed on a steering torque and an example of a result of determining a steering operation of a driver with respect to the steering torque after filtering.

FIG. 3 is a diagram which shows an example of a result of the filtering processing on the steering torque and an example of a result of the determination of a steering operation of the driver on the steering torque after filtering. In the example of FIG. 3, the horizontal axis indicates a time, and the vertical axis indicates a speed VM of the vehicle M, an actual steering torque (a steering torque before filtering), a steering torque after filtering, and a result of the determination of a steering operation.

The steering operation detector 122 detects a lane keeping steering operation when an amount of change in the steering torque (the amount of change from a reference position (for example, 0)) exceeds a threshold value (a determination threshold value). In the example of FIG. 3, a section between times Ta and Tb, a section between times Tc and Td, and a section between times Te and Tf are, for example, steering operation sections in which a correction operation is performed because the vehicle M is too close to the partition line LN1 or LN2, and are sections in which a lane keeping steering operation needs to be detected.

Here, since the amount of change in the steering torque is small during the lane keeping operation when the vehicle travels straight, it is difficult to determine whether the steering operation is being performed if the torque value is used without changing. Therefore, in the embodiment, a steering torque variation that changes in small steps during the lane keeping operation is extracted by filtering, and the steering operation is determined by an amplitude of the torque after the filtering. For example, the steering operation detector 122 performs filtering processing to extract the steering torque within a predetermined range (a predetermined frequency band) set in advance.

Here, the predetermined range is set to a range in which at least information related to a steering torque (a low frequency side) for turning of the vehicle M and a steering torque (a high frequency side) generated by an influence of unevenness on a road surface on which the vehicle M travels (disturbances from the road surface, and the like) is excluded. As an example, a filtering passband as a predetermined range is about 1 to 3 [Hz], but may be any other values as long as at least a lower limit of the predetermined range is a value greater than 0 (zero). By this filtering processing, it is possible to exclude information on the steering torque other than the lane keeping steering (torques by turning and a road surface component input), so that lane keeping steering operation information can be acquired more accurately. For example, the steering operation detector 122 sets determination threshold values (an upper limit value and a lower limit value) for the steering torque after filtering in advance, and detects that a lane keeping steering operation has been performed when the set threshold value is exceeded.

Due to the filtering processing described above, a slight delay time (for example, about 1 second) occurs from an occurrence of an actual steering torque (the detection of the steering torque by the SW sensor 82A) to an acquisition of the steering torque after filtering. In the example of FIG. 3, times that exceed the determination threshold values after filtering (times when a lane keeping steering operation is detected) Tg, Th, and Ti for each of start times of the steering operation section Ta, Tc, and Te are delayed with respect to the start times Ta, Tc, and Te. Here, in determination of a lane keeping steering operation, for example, when the vehicle M travels on a straight road, a large steering operation is not required, so that a delay of about 1 second is considered to have little effect that causes discomfort to the driver. Comparing this delay time with a detection accuracy of a lane keeping steering operation by filtering processing, a disadvantage of not performing filtering processing, which introduces noise and lowers a determination accuracy of a lane keeping steering operation, is greater. For this reason, in the embodiment, the filtering processing described above is performed to give priority to the determination accuracy of a lane keeping steering operation.

On the basis of the information on the steering torque after filtering, the steering operation detector 122 may detect that the driver is not performing a steering operation (no operation), and may also detect a no-operation section (in other words, "a steering operation degradation section" or "a careless driving section"). For example, the steering operation detector 122 detects no operation when the steering torque after filtering does not exceed the determination threshold value, and detects a section in which a no-operation state continues as a no-operation section. The steering operation detector 122 may determine that a lane keeping steering operation has not been performed when a steering operation within a predetermined range has not been detected for a predetermined time (a second predetermined time) or more. The steering operation within a predetermined range here is, for example, a steering in which the steering torque extracted after filtering processing exceeds the determination threshold value.

When the steering operation detector 122 detects no operation (or a no-operation section), it takes into account the delay time due to filtering processing described above, and sets a time greater than the delay time (for example, about 1 to 2 seconds) to a no-operation confirmation wait time (a wait time until no operation is detected), and as shown in FIG. 3, no operation is not detected from a detection of a lane keeping steering operation to an elapse of the no-operation confirmation wait time. As a result, it is possible to suppress erroneous detection that there is no change in the steering torque after filtering due to the influence of the delay time caused by the filtering processing, and there is no operation even though the steering operation is actually being performed (with changes in the steering torque). When the deviation alarm is allowed to be executed in a case of no operation, excessive deviation alarm can be suppressed by performing the no-operation detection processing described above.

The road condition determiner 132 of the determiner 130 determines whether a road shape of the current position on the travel lane is a curved road, or determines whether a road shape of a position that the vehicle will reach in a near future (within a predetermined time (a third predetermined time)) is a curved road, on the basis of the result of the recognition by the recognizer 110. When the road condition determiner 132 determines that there is a curved road in the traveling direction of the vehicle M, a distance from the vehicle M to the curved road (a start point Pl of the curved road) (in other words, a distance from the curved road) D1 may be derived.

The deviation determiner 134 of the determiner 130 determines, for example, that the vehicle M is likely to deviate from the travel lane when a reference position (for example, an edge, the center of gravity, or the center) of the vehicle M is beyond any of the left and right partition lines that divide the travel lane recognized by the recognizer 110 (passing on the partition line) and the vehicle M is likely to deviate from the travel lane, and determines that there is no possibility of the vehicle M deviating from the travel lane when there is no possibility of moving out from the lane.

The deviation determiner 134 may vary the deviation determination condition according to a road condition around the vehicle M determined by the road condition determiner 132. For example, in a case where a lane in which the vehicle M is traveling is a straight road (not a curved road), the deviation determiner 134 determines that the vehicle M is likely to deviate from the travel lane when a shortest distance D2 between a partition line of the travel lane and the vehicle M is less than a predetermined distance (a third predetermined distance), and determines that there is no possibility of deviation when the distance is greater than the predetermined distance.

The deviation determiner 134 derives a future predicted route of the vehicle M based on the speed VM and a yaw rate of the vehicle M when the lane in which the vehicle M is traveling is a curved road, and calculates a margin time TTLC (Time to Line Crossing) (=d/VM) until the vehicle M reaches a partition line (arc) on the basis of a distance between the derived predicted route and the partition line (a deviation route length d) and the speed VM. Then, the deviation determiner 134 determines that the vehicle M is likely to deviate from the travel lane when the margin time TTLC is less than a predetermined time (a fourth predetermined time), and determines that there is no possibility of deviation when it is more than the predetermined time. The deviation determiner 134 may determine with the same determination conditions as a curved road for a straight road, and may determine with the same determination conditions as a straight road for a curved road.

Here, processing at each time of the times T1 and T2 will be described. For example, it is assumed that a lane keeping steering operation of the vehicle M by the driver is detected by the steering operation detector 122 at the time T1. In this case, the controller 140 acquires and stores the position of the vehicle M (a distance D1 from a curved road) when the lane keeping steering operation is detected.

Then, it is assumed that, for example, the vehicle M is determined to be likely to deviate from the lane L1 by the deviation determiner 134 at the time T2. In this case, the controller 140 determines whether the time T1 at which the lane keeping steering operation is detected is within a predetermined time (a fifth predetermined time) from the time T2. When it is within the predetermined time, the controller 140 suppresses an output of a deviation alarm. Further, in addition to the predetermined time conditions described above, the controller 140 may include that the position of the vehicle M when a speed operation is detected (the distance D1 from the curved road) is within a predetermined distance (a fourth predetermined distance) or that the vehicle M is traveling on a curved road. When this condition is satisfied, the controller 140 suppresses the output of a deviation alarm.

Suppressing the output of a deviation alarm means, for example, that at least one of (a) and (b) described above included in the off-road deviation suppression control is not executed under normal circumstances. For example, depending on the driver, a lateral position of the vehicle M may be adjusted by a lane keeping steering operation before the vehicle M enters a curved road. In such a case, when a deviation alarm is output, the driver may find the alarm annoying. Therefore, in the embodiment, when a lane keeping steering operation speed operation is performed at a predetermined timing (within the fifth predetermined time) before entering the curved road, it is presumed that the driver has been able to recognize the curved road in advance, and the output of a deviation alarm is suppressed even if it is determined that the vehicle M is likely to deviate from the lane. As a result, more appropriate deviation suppression control can be achieved depending on the driving situation of the driver.

When the output of a deviation alarm is suppressed, the controller 140 may not execute reaction force control described in (c) described above, and may perform reaction force control. By executing reaction force control even if an alarm is suppressed, it is possible to drive the vehicle M more safely by suppressing annoyance caused by the alarm to the driver.

The predetermined time (the fifth predetermined time) may be a fixed time, or may be a variable time that can be changed according to the road shape (for example, the radius of curvature of a curved road, a lane width, or the like) and the speed VM of the vehicle M. When it is determined by the deviation determiner 134 that the vehicle M is likely to deviate from the lane L1 even after the predetermined time (the fifth predetermined time) has elapsed, the controller 140 executes off-road deviation suppression control, including a deviation alarm.

The controller 140 may also perform alarm suppression control under the same conditions when there is a lane keeping steering operation while the vehicle travels on a curved road, and then it is determined that the vehicle M is likely to deviate from the lane L1 by the deviation determiner 134. The controller 140 may add no operation (or a no-operation section) as a condition for executing the deviation alarm.

When the conditions described above are satisfied, the controller 140 suppresses only an alarm for an off-road deviation, and does not suppress other controls (for example, CMBS control that warns the driver when the vehicle M is likely to come into contact with an obstacle). As a result, alarms for other than off-road deviation can also be output in a more appropriate situation.

Processing Flow

Next, an example of processing executed by the driving support device 100 in the embodiment will be described using a flowchart. In the following example, among pieces of the processing executed by the driving support device 100, processing of suppressing a deviation alarm in the off-road deviation suppression control by a steering operation of the driver will be mainly described. Therefore, the following processing shows processing in a situation where lane change control or the like is not performed. The following processing may be repeatedly executed at a predetermined cycle or timing.

First Example

Figure 4:
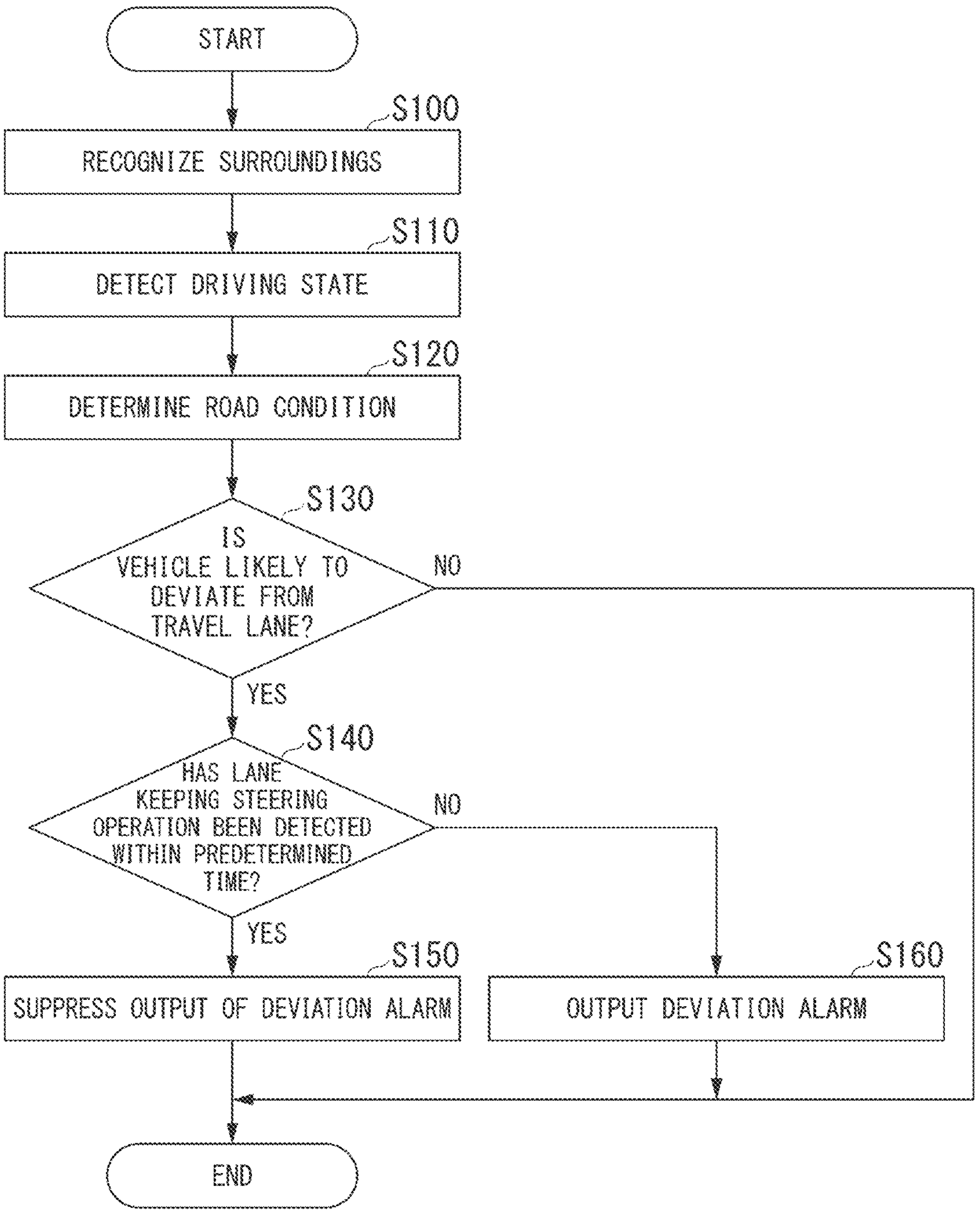
FIG. 4 is a flowchart which shows a first example of the alarm suppression processing.

FIG. 4 is a flowchart which shows a first example of alarm suppression processing. In the example of FIG. 4, the recognizer 110 recognizes the surroundings of the vehicle M (step S100). Next, the driving state detector 120 detects a driving state of the vehicle M or the driver (step S110). Next, the road condition determiner 132 determines a road condition in the traveling direction of the vehicle M (step S120). In the processing of step S120, the road condition determiner 132 may determine, for example, whether a road in the traveling direction of the vehicle M is a curved road (whether it is a straight road).

Next, it is determined whether the vehicle M is likely to deviate from the travel lane (step S130). When it is determined that the vehicle M is likely to deviate from the travel lane, the controller 140 determines whether a lane keeping steering operation has been detected within a predetermined time by the steering operation detector 122 (step S140). When it is determined that a lane keeping steering operation has been detected within the predetermined time, the controller 140 suppresses the output of a deviation alarm (step S150). When it is determined that a lane keeping steering operation has not been detected within the predetermined time, a deviation alarm is output (step S160). As a result, processing of this flowchart ends.

Second Example

Figure 5:
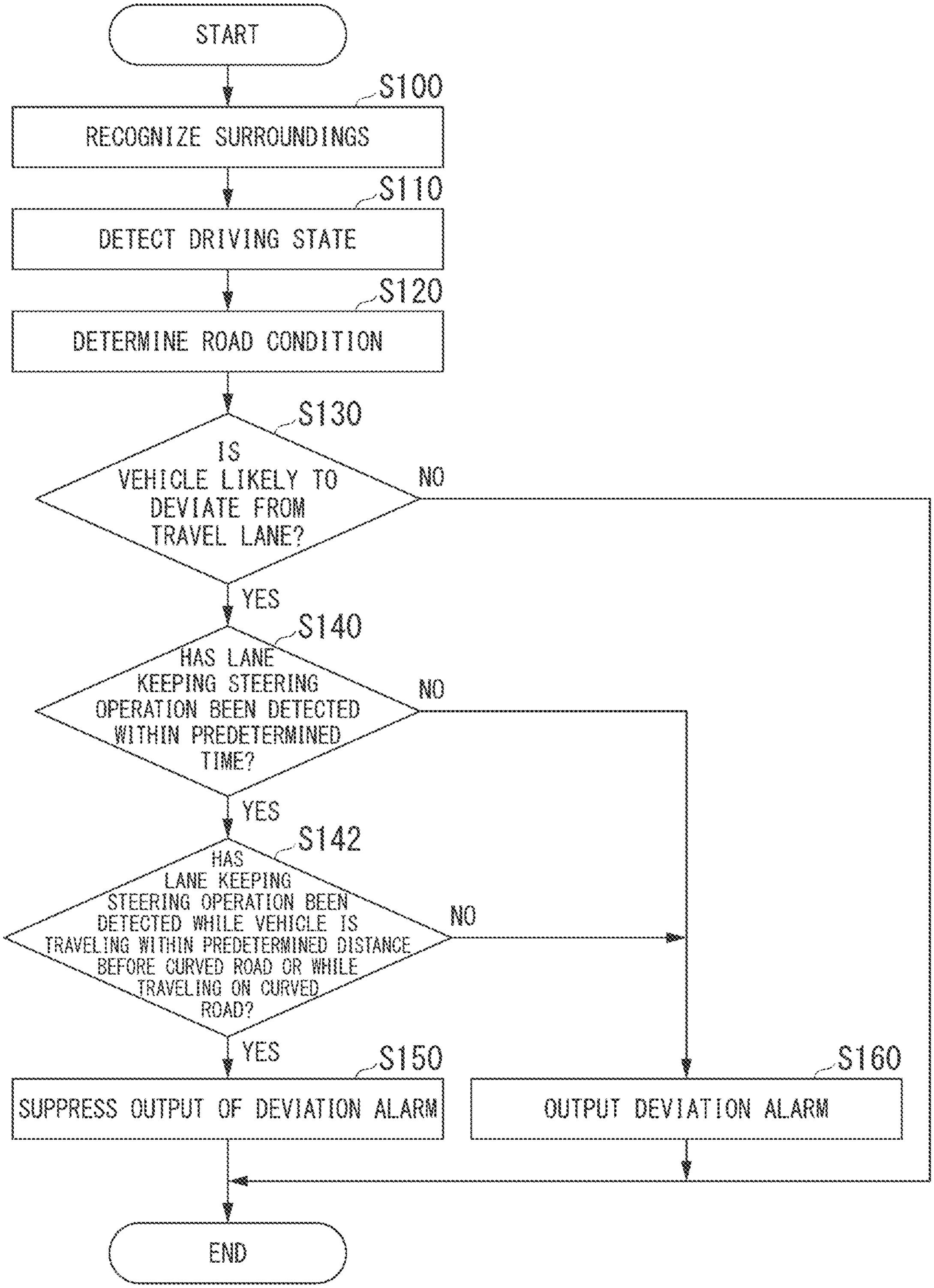
FIG. 5 is a flowchart which shows a second example of the alarm suppression processing.

FIG. 5 is a flowchart which shows a second example of the alarm suppression processing. In the second example, compared to the first example described above, a condition based on road conditions of the vehicle M on which the lane keeping steering operation is performed is further added. In processing shown in FIG. 5, in addition to the processing of step S100 to S160 shown in FIG. 4, there is a difference in that there is processing of step S142 between step S140 and step S150. In the following description, processing related to the differences will be mainly described.

In the processing of step S140 in FIG. 5, when it is determined that a lane keeping steering operation has been detected within a predetermined time, the controller 140 determines whether the detected lane keeping steering operation has been detected while the vehicle M is traveling a position within a predetermined distance before a curved road or while it is traveling on the curved road (step S142). When it is determined that the lane keeping steering operation has been detected while the vehicle M is traveling the position within a predetermined distance before a curved road or while it is traveling on the curved road, the controller 140 suppresses the output of the deviation alarm (step S150). In the processing of step S142, when the lane keeping steering operation has not been detected while the vehicle M is traveling the position within a predetermined distance before a curved road, and while the vehicle M is traveling on the curved road, the controller 140 outputs a deviation alarm (step S160).

According to the second example, for example, when a brake operation is performed at a position before a curved road, it is presumed that the driver has decelerated to travel on a curved road that is visible ahead (that is, the driver was aware of the curved road), so that it is possible to suppress excessive alarms for the driver by suppressing a deviation alarm in that case.

Modified Example

In the embodiment, the controller 140 may perform alarm suppression control for a deviation alarm on the basis of a speed operation detected by the driving state detector 120 in addition to a steering operation by the driver. In this case, for example, in addition to detection of a steering operation (a lane keeping steering operation), when a speed operation is detected while the vehicle M travels within a predetermined distance before a curved road or while it travels on the curved road, the controller 140 further suppress the output of a deviation alarm even if it is determined that the vehicle M is likely to deviate from the travel lane. In this manner, a deviation alarm can be suppressed because it is possible to more accurately ascertain that the driver is adjusting the steering and speed not to deviate from a lane by suppressing a deviation alarm when both steering and speed conditions are satisfied. Therefore, a deviation alarm can be executed (activated) in a more appropriate situation.

In the embodiment, a mode of an alarm may differ between a deviation alarm on a road other than a curved road (for example, a straight road) and a deviation alarm on a curved road. For example, in a case of a straight line, since it is assumed that the vehicle M is gradually approaching a partition line, the controller 140 generates an alarm that gradually increases the intensity according to a shortness of the distance from the partition line. In this case, the controller 140 performs, for example, only (a) described above and included in the off-road deviation suppression control on a first time, and performs both (a) and (b) on a second time. On the other hand, in the case of a curved road, since the partition line is curvature, there is a high possibility that the vehicle will immediately go out of the lane if the vehicle M does not change the steering. For this reason, the controller 140 performs both (a) and (b) with one deviation alarm when a deviation alarm is executed in the case of a curved road. As a result, a more appropriate deviation alarm can be performed according to the road condition.

As described above, the vehicle control device of the embodiment includes the recognizer 110 that recognizes the surroundings of the vehicle M, the steering operation detector 122 that detects the steering operation of the vehicle M by the driver of the vehicle M, the determiner 130 that determines whether the vehicle M is likely to deviate a travel lane on the basis of a result of the recognition by the recognizer 110, and the controller 140 that outputs a deviation alarm to the driver when it is determined that the vehicle M is likely to deviate from the travel lane by the determiner 130, in which the controller 140 suppresses the output of a deviation alarm when a lane keeping steering operation for keeping the vehicle M in the lane is detected by the steering operation detector 122, thereby performing more appropriate deviation suppression control. Thus, it is possible to contribute to a development of a sustainable transport system.

For example, according to the embodiment, it is possible to suppress the annoyance of an alarm to the occupant by presuming that the driver recognizes a curved road by a lane keeping steering operation of the driver near the curved road and suppressing a deviation alarm for a predetermined time. According to the embodiment, noise caused by disturbances from a road surface and the like, steering of the driver, and the like, can be eliminated, and lane keeping steering of the driver can be accurately detected.

The embodiment described above can be expressed as follows. A vehicle control device includes a storage medium that stores computer-readable instructions, and a processor connected to the storage medium, wherein the processor executes the computer-readable instructions to recognize surroundings of a vehicle, detect a steering operation of the vehicle by the driver of the vehicle, determine whether the vehicle is likely to deviate from a travel lane, output a deviation alarm to the driver when it is determined that the vehicle is likely to deviate from the travel lane, and suppress an output of the deviation alarm when a lane keeping steering operation for keeping the vehicle in a lane is detected.

Although a mode for carrying out the present invention has been described above using the embodiment, the present invention is not limited to the embodiment, and various modifications and substitutions can be made within a range not departing from the gist of the present invention.

What is claimed is:

1. A vehicle control device comprising:

a processor that executes instructions to:

recognize surroundings of a vehicle;

detect a steering operation of the vehicle by a driver of the vehicle;

determine whether the vehicle is likely to deviate from a travel lane on the basis of a result of recognition; and output a deviation alarm to the driver when the determiner determines that the vehicle is likely to deviate from the travel lane, wherein the processor suppresses an output of the deviation alarm when a lane keeping steering operation for keeping the vehicle in a lane is detected, wherein the processor detects the lane keeping steering operation on the basis of a steering operation in which a torque of a steering operator that receives a steering operation of the driver is in a predetermined range, wherein the predetermined range is at least a range in which information on a torque of the steering operation for turning by the vehicle and a torque of the steering operation caused by a property of a road surface on which the vehicle is traveling is excluded.

2. The vehicle control device according to claim 1, wherein a lower limit of the predetermined range is a value greater than 0.

3. The vehicle control device according to claim 1, wherein the processor determines that the lane keeping steering operation has not been performed when a steering operation within the predetermined range has not been detected for a predetermined time or more.

4. A vehicle control method comprising:

by a computer, recognizing surroundings of a vehicle;

detecting a steering operation of the vehicle by a driver of the vehicle;

determining whether the vehicle is likely to deviate from a travel lane;

outputting a deviation alarm to the driver when the vehicle is determined to be likely to deviate from the travel lane; and suppressing an output of the deviation alarm when a lane keeping steering operation for keeping the vehicle in a lane is detected, wherein, when the lane keeping steering operation is detected while the vehicle is within a predetermined distance before a curved road, it is presumed that the driver has been able to recognize the curved road in advance, the processor suppresses an output of the deviation alarm even if the vehicle is determined to be likely to deviate from the travel lane on the curved road.

5. A vehicle control device comprising:

a processor that executes instructions to:

recognize surroundings of a vehicle;

detect a steering operation of the vehicle by a driver of the vehicle;

determine whether the vehicle is likely to deviate from a travel lane on the basis of a result of recognition; and output a deviation alarm to the driver when the determiner determines that the vehicle is likely to deviate from the travel lane, wherein the processor suppresses an output of the deviation alarm when a lane keeping steering operation for keeping the vehicle in a lane is detected, wherein, when the lane keeping steering operation is detected while the vehicle is within a predetermined distance before a curved road, it is presumed that the driver has been able to recognize the curved road in advance, the processor suppresses an output of the deviation alarm even if the vehicle is determined to be likely to deviate from the travel lane on the curved road.

* * * * *